(12) United States Patent
Moeller

(10) Patent No.: US 11,071,264 B2
(45) Date of Patent: Jul. 27, 2021

(54) SYSTEM AND METHOD FOR LATCHING SOLENOID ACTIVATION DETECTION FOR VRI AND OTHER IRRIGATION USES

(71) Applicant: VALMONT INDUSTRIES, INC., Omaha, NE (US)

(72) Inventor: Mark Moeller, Valley, NE (US)

(73) Assignee: VALMONT INDUSTRIES, INC., Omaha, NE (US)

( * ) Notice: Subject to any disclaimer, the term of this patent is extended or adjusted under 35 U.S.C. 154(b) by 0 days.

(21) Appl. No.: 16/819,418

(22) Filed: Mar. 16, 2020

(65) Prior Publication Data
US 2020/0315111 A1 Oct. 8, 2020

Related U.S. Application Data

(60) Provisional application No. 62/829,146, filed on Apr. 4, 2019.

(51) Int. Cl.
*A01G 25/16* (2006.01)
*G05B 13/02* (2006.01)

(52) U.S. Cl.
CPC ....... *A01G 25/165* (2013.01); *G05B 13/0265* (2013.01)

(58) Field of Classification Search
CPC ... A01G 25/16; A01G 25/165; G05B 13/0265
See application file for complete search history.

(56) References Cited

U.S. PATENT DOCUMENTS

| | | | |
|---|---|---|---|
| 5,927,603 A | 7/1999 | McNabb | |
| 6,431,475 B1 | 8/2002 | Williams | |
| 6,721,630 B1 | 4/2004 | Woytowitz | |
| 6,917,203 B1 | 7/2005 | Perotti et al. | |
| 9,829,871 B1 * | 11/2017 | Goodman | A01G 25/167 |
| 10,409,296 B1 * | 9/2019 | Elie | B05B 1/30 |
| 10,497,250 B1 * | 12/2019 | Hayward | G06Q 40/08 |
| 2004/0011880 A1 * | 1/2004 | Addink | A01G 25/16 239/1 |
| 2009/0277506 A1 * | 11/2009 | Bradbury | A01G 25/16 137/1 |
| 2016/0067722 A1 | 3/2016 | Nelson et al. | |

(Continued)

FOREIGN PATENT DOCUMENTS

RO 133935 A2 * 3/2020 ............ A01G 25/16

*Primary Examiner* — Chad G Erdman
(74) *Attorney, Agent, or Firm* — Milligan PC LLO

(57) ABSTRACT

The present invention provides an improved valve assembly and valve controller for controlling the movement of fluid for irrigation. In according with a preferred embodiment, the present invention teaches a system and method for monitoring the status of a valve assembly and for providing "proof of placement" for selected applicants. According to further preferred embodiments, the present invention includes a valve assembly including a valve controller for applying an electric current to a latch valve thereby switching the latch valve from a first flow state to a second flow state. According to a further preferred embodiment, the valve assembly of the present invention preferably further includes a state/current detector which preferably measures the active current being applied to the latch valve and outputs the measured waveform for analysis.

14 Claims, 7 Drawing Sheets

(56) References Cited

U.S. PATENT DOCUMENTS

2018/0231143 A1    8/2018  Herrera et al.
2018/0348714 A1   12/2018  LaRue
2019/0219276 A1*   7/2019  Acker .................... E03B 7/045

* cited by examiner

SYSTEM AND METHOD FOR LATCHING SOLENOID ACTIVATION DETECTION FOR VRI AND OTHER IRRIGATION USES

RELATED APPLICATIONS

The present application claims priority to U.S. Provisional Application No. 62/829,146 filed Apr. 4, 2019.

BACKGROUND AND FIELD OF THE PRESENT INVENTION

Field of the Present Invention

The present invention relates generally to an improved valve assembly and valve controller for controlling the movement of fluid for irrigation. In particular, the present invention relates to a system and method for monitoring the status of a valve assembly and for providing "proof of placement" for selected applicants.

Background of the Invention

Presently, there is an increasing application of chemicals and fertilizers through irrigation systems. Further, there are increasing land remediation requirements for wastewater which may not be applied at the same time as irrigation water. Further, regulations require the time, location and quantity of wastewater (among other parameters) must be recorded be made available for inspection by the governing authority to ensure the waste application is within limits such that high nitrogen runoff, which may pollute neighboring streams, lakes or other waters, does not occur.

In response to these developments, there is an increasing need to verify that each irrigation system is operating properly and, more importantly, that all material is applied as intended. This is particularly important with Variable Rate Irrigation and related precision application systems since incorrect application defeats the purpose and intent of having a precision prescription. Further, increasing regulation with respect to these materials will require positive control and records showing that the material was applied at the intended time, in the correct amount and at the correct location for all applicants. This is often referred to as "proof-of-placement."

In any irrigation system, the proper application of materials is ultimately controlled by various types of solenoid-operated valves. For example, latching solenoid valves can be used as a pilot valve on a Variable Rate Irrigation sprinkler. In this application, the sprinkler solenoid will cycle the control valve on and off at a duty cycle determined by the valve controller. In another example, a solenoid valve can activate a larger control valve that starts injection of a chemical (such as a nitrogen fertilizer, fungicide, herbicide or similar crop protection chemical) into an irrigation system. This is also often done by operating one or more solenoid pilot valves to close or open various larger control valves in an interlocked fashion to ensure compliance. Again, these solenoid valves are often operated by a valve controller in the correct sequence.

A number of solutions have been developed to measure the operation of individual valves such as adding a pressure sensor or flow meter downstream of the valve to measure changes to the pipeline pressure or flowrate as the valve changes state. However, these systems suffer from a number of shortcomings, including high cost, additional complexity and additional points of failure (e.g. a corroded turbine in the flowmeter or an incorrect calibration on a pressure sensor) which may cause incorrect data to be recorded. Prior art systems have attempted to provide combinations of sensors to provide accurate and convenient data for operators. However, the fundamental limitations of the prior art systems remain.

To overcome the limitations of the prior art, a reliable and effective system is needed for monitoring and activating latching valves/solenoids during irrigation operations.

SUMMARY OF THE PRESENT INVENTION

To address the shortcomings presented in the prior art, the present invention provides an improved valve assembly and valve controller for controlling the movement of fluid for irrigation. In accordance with a preferred embodiment, the present invention teaches a system and method for monitoring the status of a valve assembly and for providing "proof of placement" for selected applicants.

According to further preferred embodiments, the present invention includes a valve assembly including a valve controller for applying an electric current to a latch valve thereby switching the latch valve from a first flow state to a second flow state. According to a further preferred embodiment, the state change of a latch valve may preferably be accomplished by applying a DC pulse to the latching coil of the latch valve.

According to a further preferred embodiment, the valve assembly of the present invention may preferably further include a state/current detector which preferably measures the active current being applied to the latch valve and outputs the measured waveform for analysis. According to a further preferred embodiment, the present invention may preferably further include a controller and an algorithm to analyze the measured waveform and to identify decreases in current indicating a change state by the latch valve.

According to a further preferred embodiment, the system of the present invention may further include the mapping of the valve location and the tracking of the valve status during irrigation.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
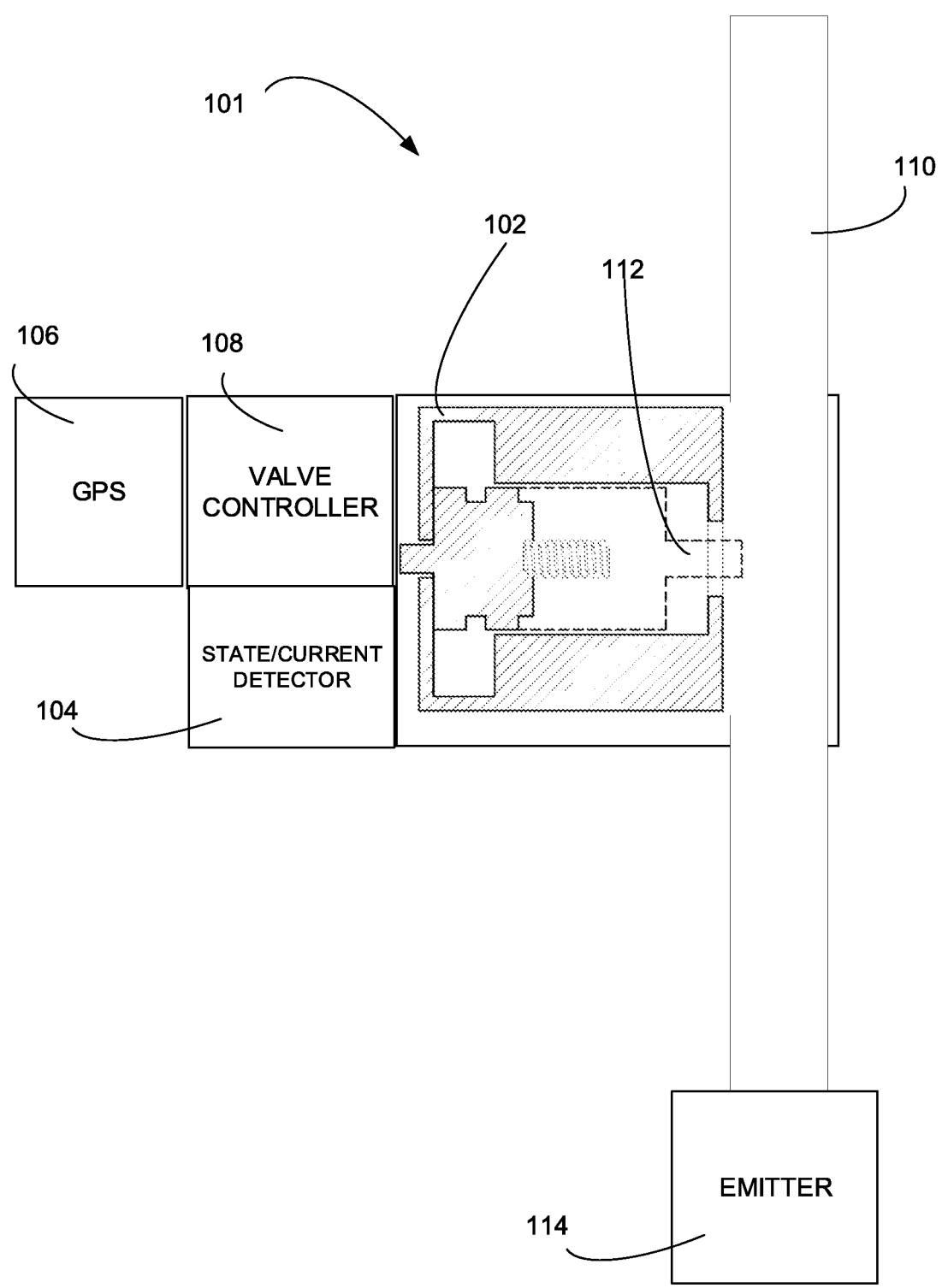
FIG. 1 shows an exemplary latching valve assembly in accordance with a first preferred embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic link library and/or other sequence of instructions designed for execution on a computer system. A data storage means, as defined herein, includes many different types of computer readable media that allow a computer to read data therefrom and that maintain the data stored to allow the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structure), mixed analog and digital, and the like.

With reference now to FIG. 1, an exemplary valve assembly 101 which represents functionality to control one or more operational aspects of an irrigation system will now be discussed. As shown, an exemplary valve assembly 101 preferably includes a latch valve 102 (or the like) attached to a pressurized applicant source/pipe 110. As used herein, applicant preferably refers to any liquid or liquid mixture which is deliverable through an irrigation system. Further, although the present invention is discussed primarily with reference to a latch valve, many other valves and/or valve combinations may be used without departing from the scope of the present invention.

In accordance with the present invention. the valve assembly 101 of the present invention preferably further includes a valve controller 108 for applying an electric current to the latch valve 102 to switch the latch valve 102 from a first flow state (i.e., valve open) to another flow state (i.e., valve closed). The latch valve 102 then stays in the selected flow state until a second electric current is applied in the opposite direction. According to a preferred embodiment, the state change may preferably be accomplished by applying a DC pulse to the latching coil. Reversing the polarity of the DC pulse will reverse (change) the state of the valve. According to a further preferred embodiment, the electric current is preferably applied in a pulse which may be 10-100 milliseconds. In response to this pulse, the solenoid of the latch valve 102 will shift and secure the armature 112 into one of two positions to open flow and/or cut-off the flow of applicant through the inlet pipe 110 and out through an emitter 114.

According to a further preferred embodiment, the valve assembly 101 of the present invention preferably further includes state/current detector 104 which preferably measures the active current being applied to the latch valve 102. According to an alternative preferred embodiment, the valve assembly 101 may further include a GPS chip 106 although the GPS location data may also be received from a variety of other sources.

Figure 2:
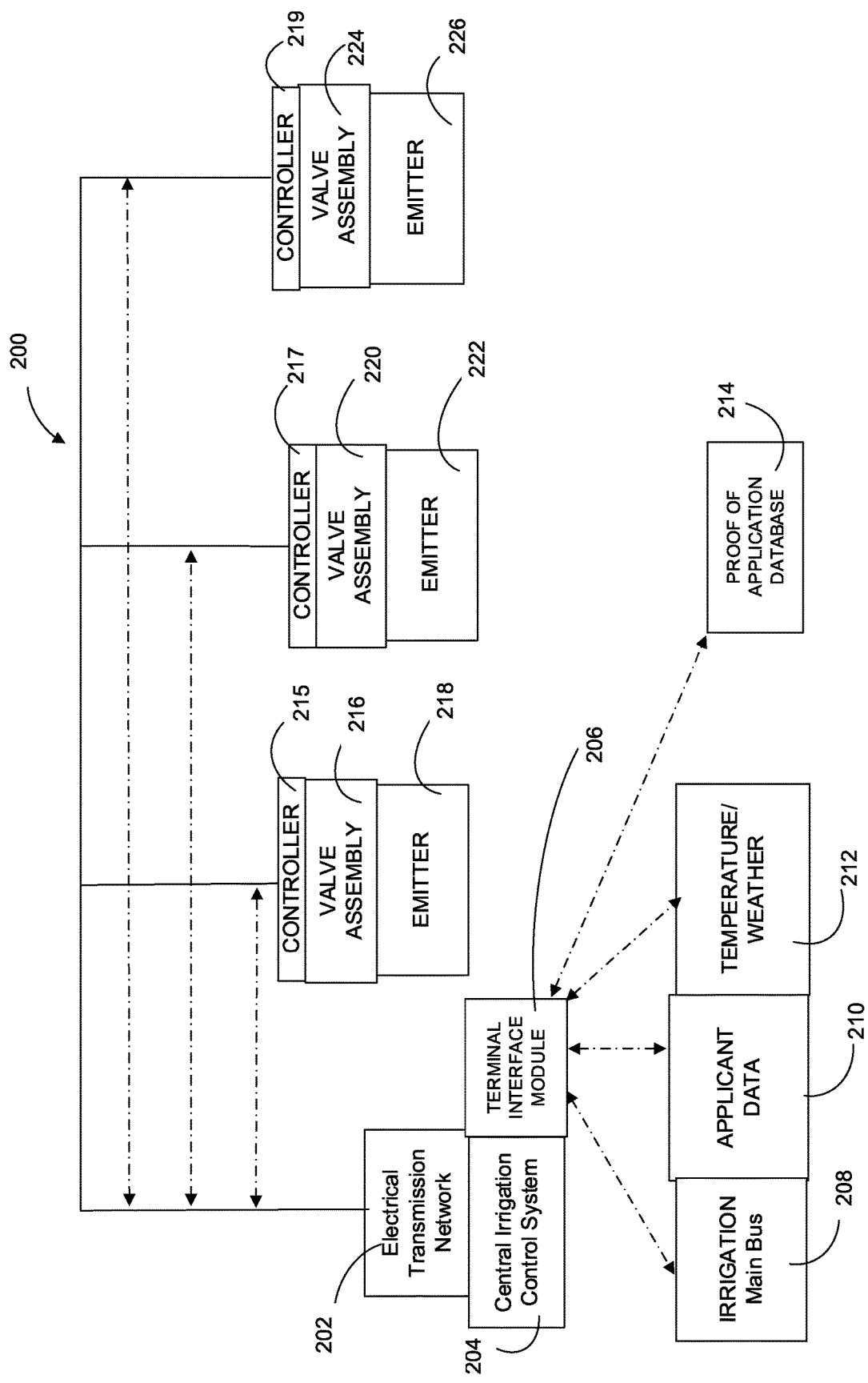
FIG. 2 shows a block diagram illustrating an exemplary system incorporating the valve assembly shown in FIG. 1.

As shown in FIG. 2, the valve assembly 101 shown in FIG. 1 may preferably be used within a larger irrigation system 200 and in conjunction with a variety of valve assemblies 216, 220, 224 and emitters 218, 222, 226. As shown in FIG. 2, the valve assemblies 216, 220, 224 may preferably receive electrical control signals and data from a central irrigation controller/control system 204 via a hardwired electrical network 202 or via wireless transmission. Likewise, the central irrigation controller 204 may preferably receive status updates from the individual valve assemblies 216, 220, 224 including state detection data from each state/current detector 104. Further, the central irrigation controller 204 may preferably further receive data (via a terminal interface module 206 or the like) from the irrigation system main bus 208. The received data may include information regarding the applicant being applied 210 as well as temperature/weather data 212.

Preferably, the respective valve controller(s) 215, 217, 219 within each valve assembly 216, 220, 224 are in communication with the control system 204. The communication links may be of any type, such as power line carrier, Wi-Fi, Digital Radio, hardwired (Ethernet) or the like. The control unit 204 may command one or more of the valve controllers 215, 217, 219 based on algorithms stored in the memory of the control unit 204. In addition, the control unit 204 may receive inputs from a variety of sensors on the irrigation machine, from in-field sensors, from remote sensors or data sources such as satellite imagery, weather forecast sources and the like. The control unit 204 may utilize these inputs in various ways to adjust or modify the state of one or more individual valve controllers 215, 217, 219.

Further the control unit 204 may be in communication with a central command system via a similar communications link, wherein the central command system may also receive a variety inputs from various data sources including the irrigation machine, the water supply network, chemical injection pumps, other control valves, weather services, weather stations, satellite imagery, in-field sensors, and the like. Further the central command system may use any number of algorithms or machine learning techniques with the above inputs to determine complex changes to multiple controllers and transmit those instructions to the control units for implementation by the various valve controllers 215, 217, 219. Further, the central command system and the control unit 204 may employ a user interface to allow an operator (grower, farm manager, system operator, crop consultant and the like) to approve or reject recommended changes and to provide control commands based on information and human experience not available to the control system.

According to a further preferred embodiment, the central irrigation control system 204 of the present invention may preferably receive all data inputs, time stamp selected data and provide the collected, time stamped data to a proof of application database 214 or the like. In particular, the database 214 may preferably receive and store valve status data from each state/current detector 104 along with GPS and time data.

The controllers and processors of the present invention may include any number of processors, micro-controllers, or other processing systems. Further, the controllers and processors may execute one or more software programs that implement techniques described herein.

Figure 3:
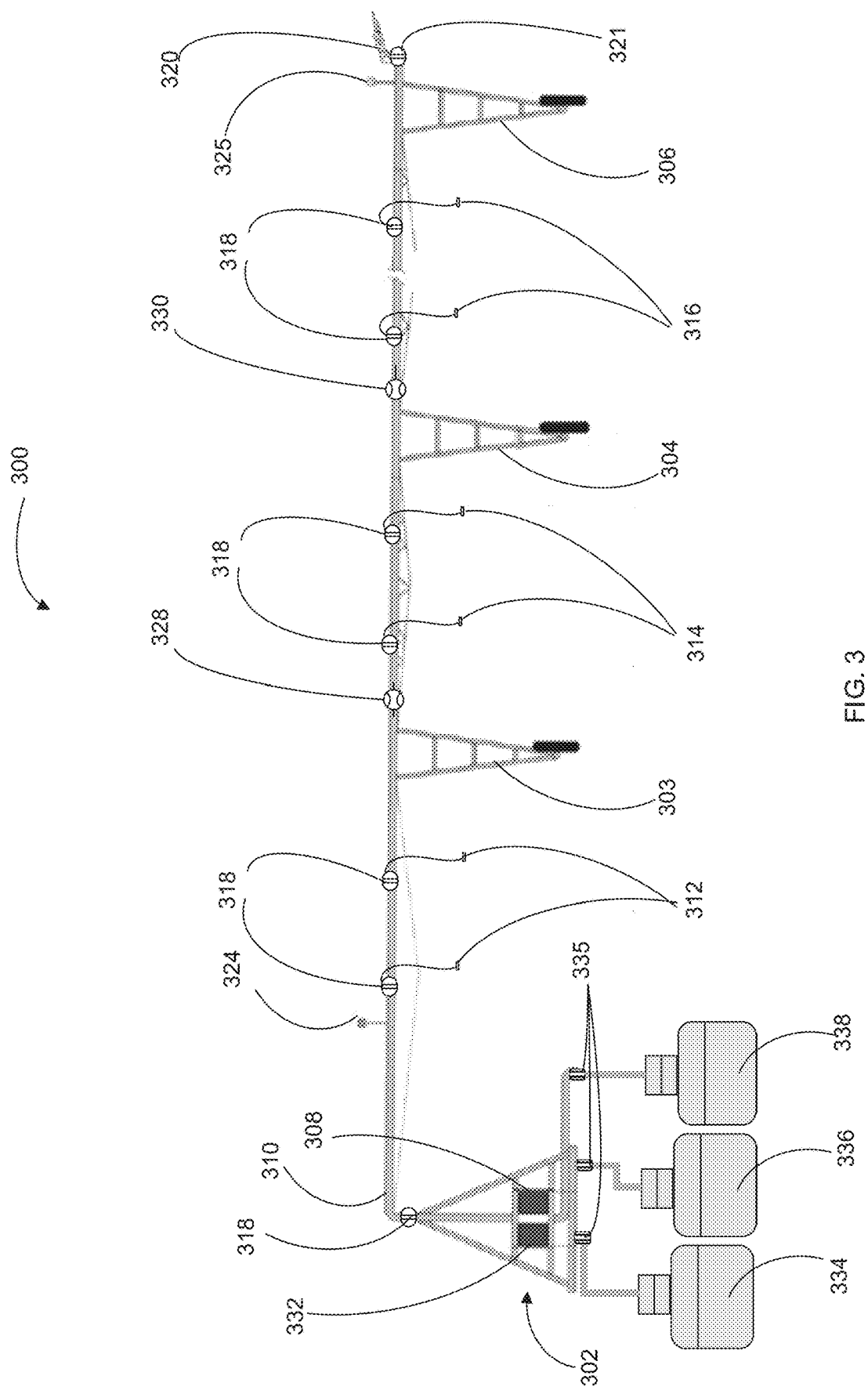
FIG. 3 shows a block diagram in accordance with further preferred embodiment of the present invention.

With reference now to FIG. 3, an exemplary system 300 incorporating aspects of the present invention shall now be further discussed. As shown, the system 300 may preferably be attached to a water source 302 or the like to supply water or applicants under pressure to the system 300. Additionally, the system may preferably be able to receive water or applicants under pressure from tanks or reservoirs 334, 336, 338 via injection pumps 335 or the like. As further shown, an exemplary irrigation system 300 may include valve assemblies 318, 320 which control water flow to a variety of emitters 312, 314, 316 and an end gun 321. Further the system as shown may preferably include exemplary transducers 328, 330 for monitoring water pressure. Further, the system includes respective drive towers 303, 304, 306 to support and move the entire span 310. Further, the system 300 of the present invention may preferably further include a control/pivot panel 308 as well as a flow meter 332 for monitoring overall water flow in the system.

According to alternative preferred embodiments, the system may also use a power line carrier system or separate wired network to transmit signals between system elements. Further, the preferred system of the present invention may alternatively further include additional elements mounted to the span 310 such as additional sensors 324, 325 and the like.

Figure 4:
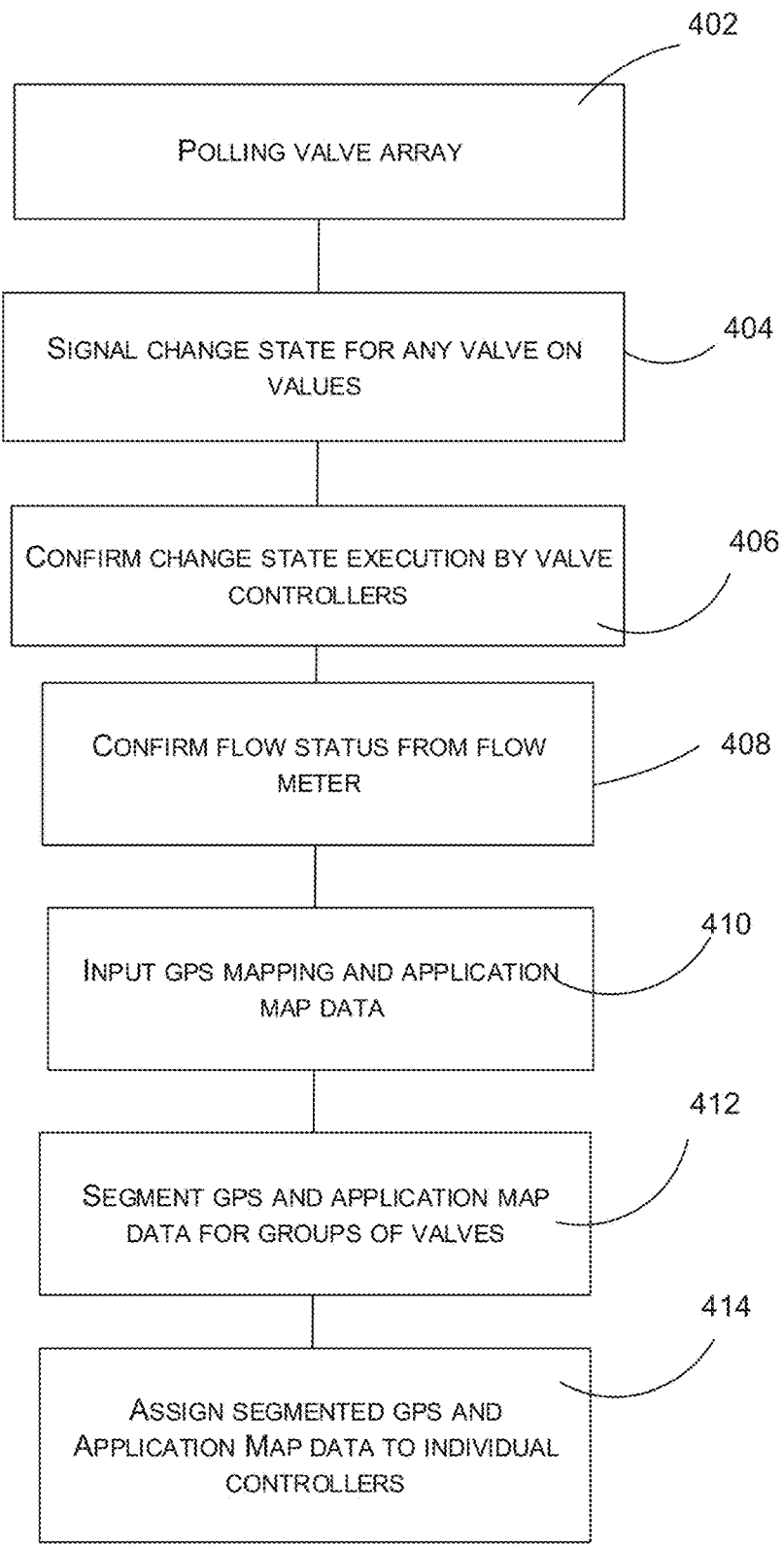
FIG. 4 shows an exemplary method for use with the present invention.

With reference now to FIG. 4, further aspects of the present invention shall now be further discussed. As shown in FIG. 4, an exemplary integrated sensor suite element 400 of the present invention may preferably include groups of integrated sensors, processors, and communication chips which may function separate and apart from the systems of the larger irrigation machine. Alternatively, the exemplary integrated sensor suite element 400 of the present invention may share processing and management functions with processors and sensors of the irrigation machine in order to provide redundancies and processing speed where needed.

Figure 5:
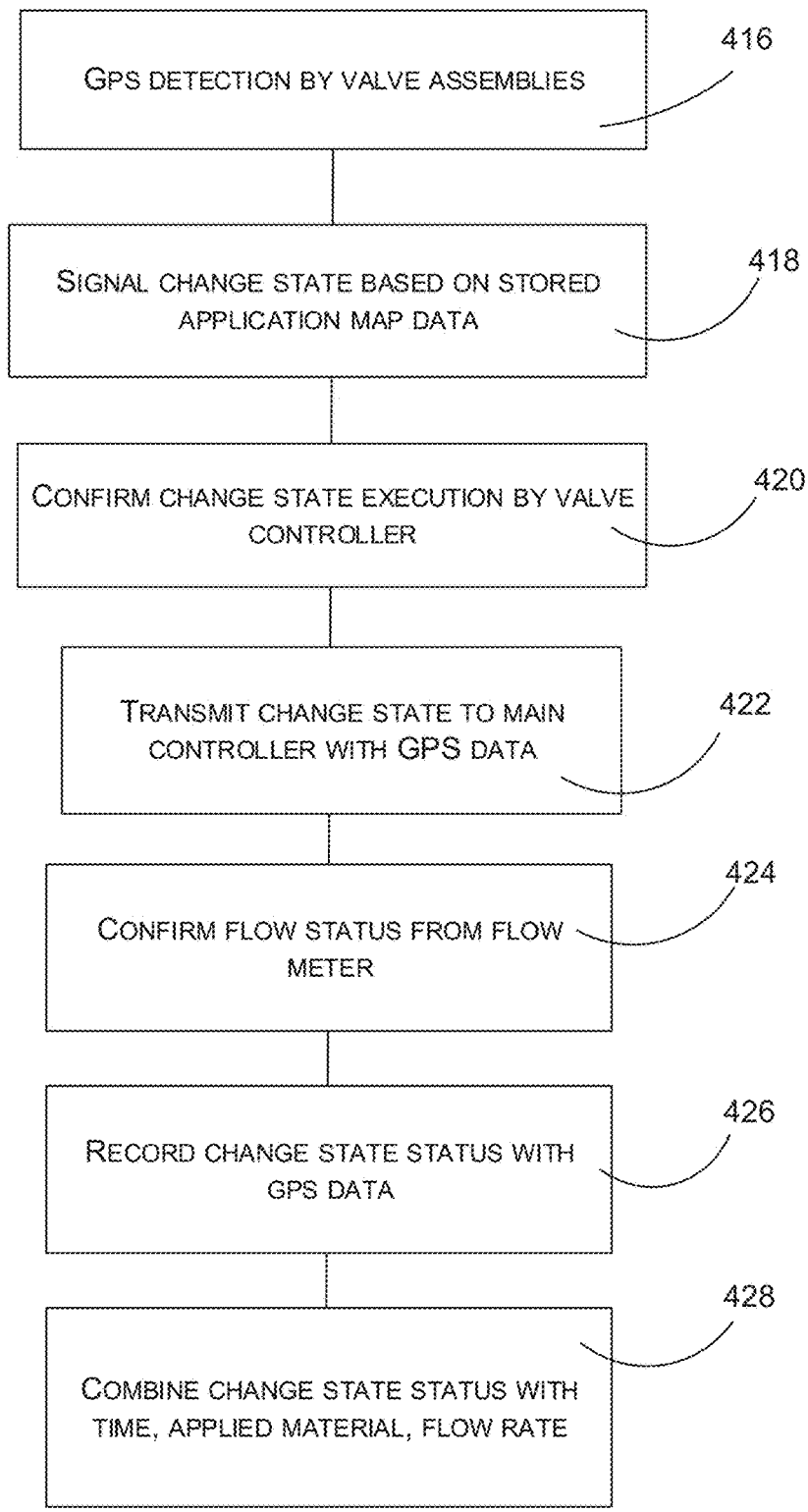
FIG. 5 shows further steps of an exemplary method for use with the present invention.

With reference now to FIGS. 4-5, an exemplary method for use with the systems of the present invention shall now be further discussed. As shown in FIG. 4, an exemplary first step 402 initiated by the main irrigation controller as shown is to first poll the available valves in the system. To synchronize the status of the valve array, the system controller in step 404 may then signal each valve which is in an ON state to change to an OFF state. At a next step 406, the system controller may then poll each valve controller to confirm execution of the signaled state changes based on the measurements of the state/current detectors of each valve assembly. At a next step 408, the system controller may further confirm the flow status of the system by polling a flow meter or the like. At a next step 410, the system controller may input GPS, mapping and application data for an area to be irrigated. At a next step 412, the system controller may segment the GPS and application map data for each individual valve controller. At a next step 414, the system controller may then assign the segmented GPS and application map data to individual valve controllers.

At a next step 416, the individual valve assemblies may obtain their GPS location and orientations. Thereafter, at a next step 418, the individual valve systems may change their states (OPEN or CLOSED) based on a comparison of stored application map data and their determined GPS locations. At a next step 420, the system may preferably confirm change state execution by each valve controller based on the measurements of the state/current detectors of each valve assembly.

At a next step 422, the system may preferably transmit change state data to the main controller with GPS data. Thereafter, at step 424 the system controller may preferably confirm the flow status from the flow meter(s) and record the change state status. At step 428, the collected data may be further combined with the valve locations on the machine, machine position data from a GPS sensor or the like, the current time, material being applied and the fixed parameters of that particular valve to provide a "proof-of-placement" record which can then be stored either at the control unit or transmitted to the central command system.

Figure 6:
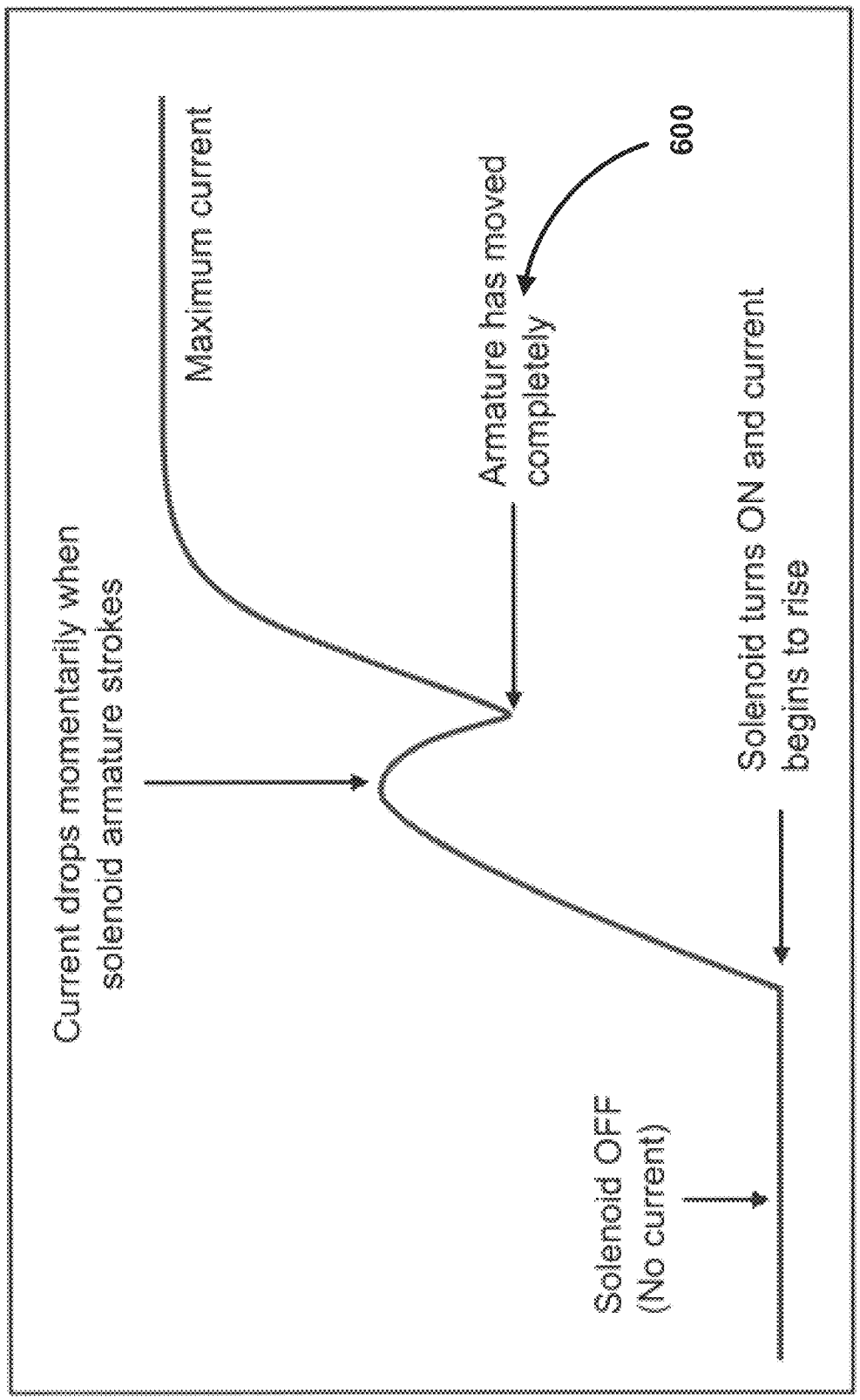
FIG. 6 is a block diagram of an exemplary circuit in accordance with a preferred embodiment of the present invention.
Figure 7:
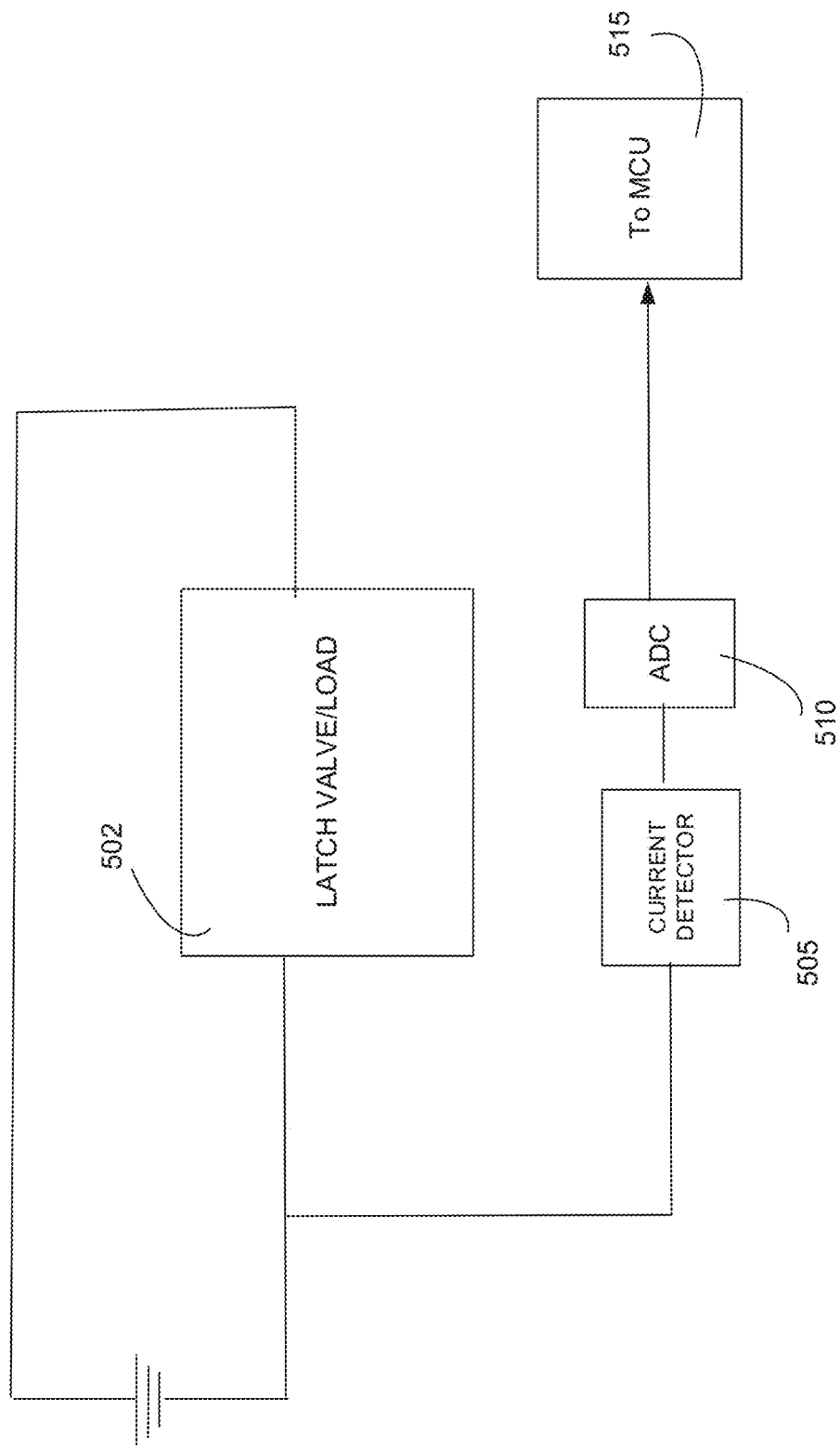
FIG. 7 provides an illustration of an exemplary waveform showing the level of measured current over time in accordance with a further preferred embodiment of the present invention.

With reference now to FIGS. 6 and 7, a preferred method of detecting latch valve state changes will now be discussed. According to preferred embodiments, the sensing of the opening or closing of the latch valve solenoid is accomplished by measuring the change in inductance in the coils as the armature moves. According to a further preferred embodiment, this sensing is preferably done by monitoring the current through the solenoid during a state change (e.g. opening or closing the solenoid-operated valve). As shown in FIG. 6, the change in the latch valve state may be identified by detecting a measured drop in the value of the measured current. Specifically, as shown in FIG. 6, a momentary dip 600 in the current or voltage waveform occurs when the valve plunger (armature) moves. This is true regardless of the direction of the plunger movement. Therefore, any change (e.g. on and off) can be detected with this method. According to a preferred embodiment, the state change is preferably detected by identification of the local minimum 600 in the current value over time.

According to preferred embodiment, the current can be monitored directly or by any traditional method (e.g. measuring the voltage across a 1-ohm resistor wired in parallel with the coil circuit) and the resulting waveform sent through a standard Analog/Digital converter. Thereafter, the local valve controller may then analyze the detected waveform to identify the local minimum 700 to verify that the valve has completed the commanded operation (open or closed, ON or OFF). Further, data from the state of the valves may be used within this system to verify the system is applying the materials as intended via the algorithms or machine learning techniques described herein. Further, the data may trigger the control system 204 to stop the machine or notify the operator(s) of an error (e.g. the valves are not operating as intended).

With reference now to FIG. 7, a simplified diagram showing an exemplary current detection arrangement is shown. As detailed, the current sensor 505 of the present invention may be arranged in parallel with the latch valve 502 control circuit. The current sensor 505 may then provide an output signal which is converted from analog to digital 510 (if needed). The converted signal may preferably be to the main control unit 515 to analyze the recorded wave form. According to a further preferred embodiment, if the dip in the waveform is not detected or is abnormal, the local valve controller may immediately send an error code or re-try the activation of the valve a pre-defined number of times before sending an error code to the control unit. Further the valve controller then can notify the control unit of a successful state change. According to a further preferred embodiment, state change indications from multiple valves may preferably be combined to provide complex functionality of multiple valves (e.g. "interlock" capability) by ensuring one or more valves has completed a change in state before one or more other valves are commanded to activate. Preferably, this may be done via an algorithm programmed at the valve controller, control unit or the central command system.

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A system for providing sensing and communications within an irrigation system having at least one span and a drive system for moving the span, wherein the system comprises:
   a latch valve;
   a valve controller, wherein the valve controller is configured to apply an electric current to the latch valve thereby switching the latch valve from a first flow state to a second flow state;
   a GPS receiver for receiving positional data;
   a state detector, wherein the state detector is configured to measure the active current being applied to the latch valve; further wherein the state detector is configured to output a waveform of the measured current over time; and
   an irrigation controller, wherein the irrigation controller is configured to receive the measured waveform; wherein the irrigation controller further comprises an algorithm to analyze the measured waveform and to identify decreases in current indicating a change state by the latch valve;
   wherein the latch valve is functionally connected on first end to an inlet pipe; wherein the latch valve is functionally connected on a second end to an emitter;
   where the latch valve comprises an armature; wherein the armature is movable between a retracted position when the latch valve is in the first flow state, and an extended position when the latch valve is in the second flow state;
   wherein the latch valve stays in a selected flow state until a second electric current is applied in the opposite direction;
   wherein the electric current is applied as a DC pulse to a latching coil of the latch valve;
   wherein reversing the polarity of the DC pulse will change the state of the latch valve;
   wherein the electric current is applied in a pulse having a pulse rate in the range of 10-100 milliseconds;
   wherein the latch valve is configured to shift and secure the armature between the retracted positioned and the extended position in response to the pulse of electrical current; wherein the latch valve is configured to open the flow of an applicant through the latch valve when the armature is in the retracted position;
   wherein the latch valve is configured to cut-off the flow of applicant through the latch valve when the armature is in the retracted position;
   wherein the system comprises plurality of latch valve assemblies; wherein each latch valve assembly comprises at least: a valve controller, first state detector, a first latch valve, and a first emitter;
   wherein each of the plurality of latch valve assemblies receives electrical control signals and data from the irrigation controller;
   wherein the irrigation controller receives status updates from one or more of the plurality of latch valve assemblies;
   wherein at least one status update comprises state detection data from each latch valve assembly;
   wherein the irrigation controller is configured to receive irrigation data from an irrigation system main bus;
   wherein the irrigation data comprises applicant data;
   wherein the irrigation data comprises weather data;
   wherein the irrigation controller is configured to receive inputs from one or more sensors; wherein the one or more sensors are selected from a group sensors comprising: irrigation machine sensors; in-field sensors; and remote sensors;
   wherein the irrigation controller is configured to receive satellite imagery data and weather forecast data; wherein the irrigation controller is configured to modify the state of one or more valve controllers based at least in part on received satellite imagery data and weather data;
   wherein the applicant data comprises chemical injection pump data;
   wherein the irrigation controller comprises a machine learning algorithm; and
   wherein the machine learning algorithm is configured to determine changes to one or more system instructions; further wherein the machine learning algorithm is configured to transmit one or more instruction changes for implementation by the one or more valve controllers.

2. The system of claim 1, wherein the system further comprises a user interface; wherein the user interface is configured to allow a user to accept or reject an instruction change.

3. The system of claim 2, wherein the irrigation controller is configured to time stamp selected data and provide the time stamped data to a proof of application database.

4. The system of claim 3, wherein the proof of application database is configured to receive and store valve status data from at least a first valve controller.

5. The system of claim 4, wherein the proof of application database stores at least a first set of GPS data and a second set of time stamp data corresponding to the stored valve status data.

6. A system for providing sensing and communications within an irrigation system having at least one span and a drive system for moving the span, wherein the system comprises:
- a latch valve;
- a valve controller, wherein the valve controller is configured to apply an electric current to the latch valve thereby switching the latch valve from a first flow state to a second flow state;
- a GPS receiver for receiving positional data;
- a state detector, wherein the state detector is configured to measure the active current being applied to the latch valve; further wherein the state detector is configured to output a waveform of the measured current over time; and
- an irrigation controller, wherein the irrigation controller is configured to receive the measured waveform; wherein the irrigation controller further comprises an algorithm to analyze the measured waveform and to identify decreases in current indicating a change state by the latch valve;
- wherein the latch valve is functionally connected on first end to an inlet pipe; wherein the latch valve is functionally connected on a second end to an emitter;
- where the latch valve comprises an armature; wherein the armature is movable between a retracted position when the latch valve is in the first flow state, and an extended position when the latch valve is in the second flow state;
- wherein the latch valve stays in a selected flow state until a second electric current is applied in the opposite direction;
- wherein the latch valve is configured to shift and secure the armature between the retracted positioned and the extended position in response to the pulse of electrical current; wherein the latch valve is configured to open the flow of an applicant through the latch valve when the armature is in the retracted position;
- wherein the latch valve is configured to cut-off the flow of applicant through the latch valve when the armature is in the retracted position;
- wherein the system comprises plurality of latch valve assemblies; wherein each latch valve assembly comprises at least: a valve controller, first state detector, a first latch valve, and a first emitter;
- wherein each of the plurality of latch valve assemblies receives electrical control signals from the irrigation controller;
- wherein the irrigation controller receives status updates from one or more of the plurality of latch valve assemblies;
- wherein at least one status update comprises state detection data from each latch valve assembly;
- wherein the irrigation controller is configured to receive irrigation data, wherein the irrigation data comprises data selected from the group of irrigation data comprising: applicant data, satellite imagery data and weather data;
- wherein the irrigation controller is configured to receive inputs from one or more sensors; wherein the one or more sensors are selected from a group sensors comprising: irrigation machine sensors; in-field sensors; and remote sensors;
- wherein the irrigation controller is configured to modify the state of one or more valve controllers based at least in part on the received irrigation data;
- wherein the irrigation controller comprises a machine learning algorithm; and
- wherein the machine learning algorithm is configured to determine changes to one or more system instructions; further wherein the machine learning algorithm is configured to transmit one or more instruction changes for implementation by the one or more valve controllers.

7. The system of claim 6, wherein the system further comprises a user interface; wherein the user interface is configured to allow a user to accept or reject an instruction change.

8. The system of claim 7, wherein the irrigation controller is configured to time stamp selected data and provide the time stamped data to a proof of application database.

9. The system of claim 8, wherein the proof of application database is configured to receive and store valve status data from at least a first valve controller.

10. The system of claim 9, wherein the proof of application database stores at least a first set of GPS data and a second set of time stamp data corresponding to the stored valve status data.

11. The system of claim 10, wherein the electric current is applied as a DC pulse to a latching coil of the latch valve.

12. The system of claim 11, wherein reversing the polarity of the DC pulse will change the state of the latch valve.

13. The system of claim 12, wherein the electric current is applied in a pulse having a pulse rate in the range of 10-100 milliseconds.

14. The system of claim 13, wherein the applicant data comprises chemical injection pump data.

* * * * *